Nov. 19, 1968   C. R. CAWLEY   3,411,181
PROCESS FOR PRODUCING SEALING MATERIAL
Filed Jan. 14, 1965   2 Sheets-Sheet 1
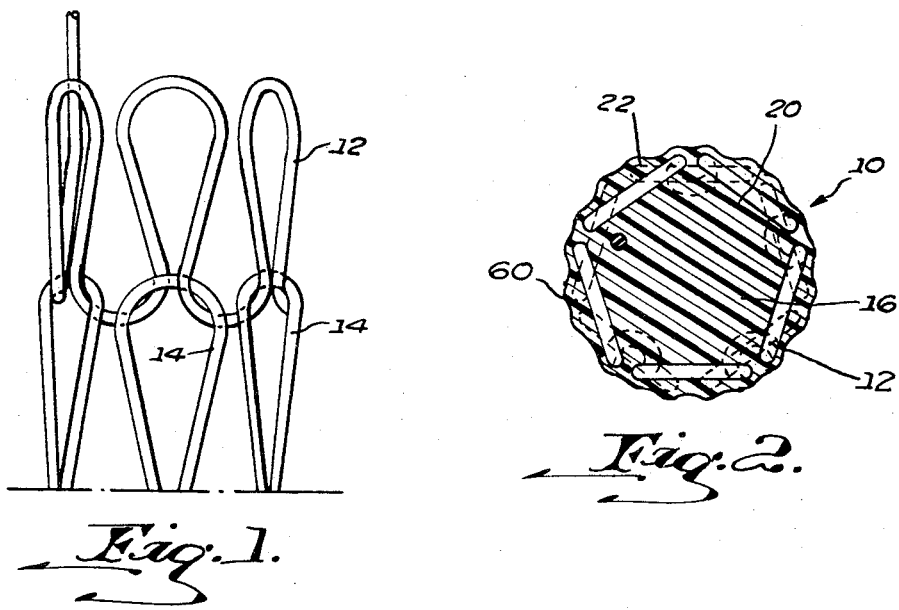
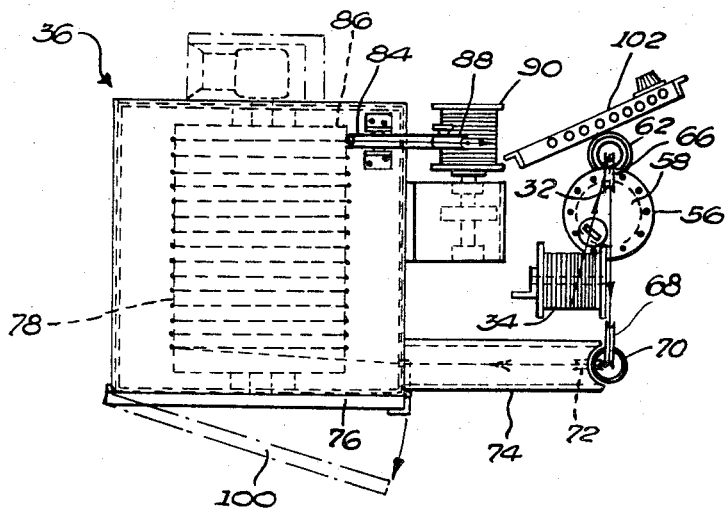
INVENTOR.
CHARLES R CAWLEY
BY John A. Young
his ATTORNEY.

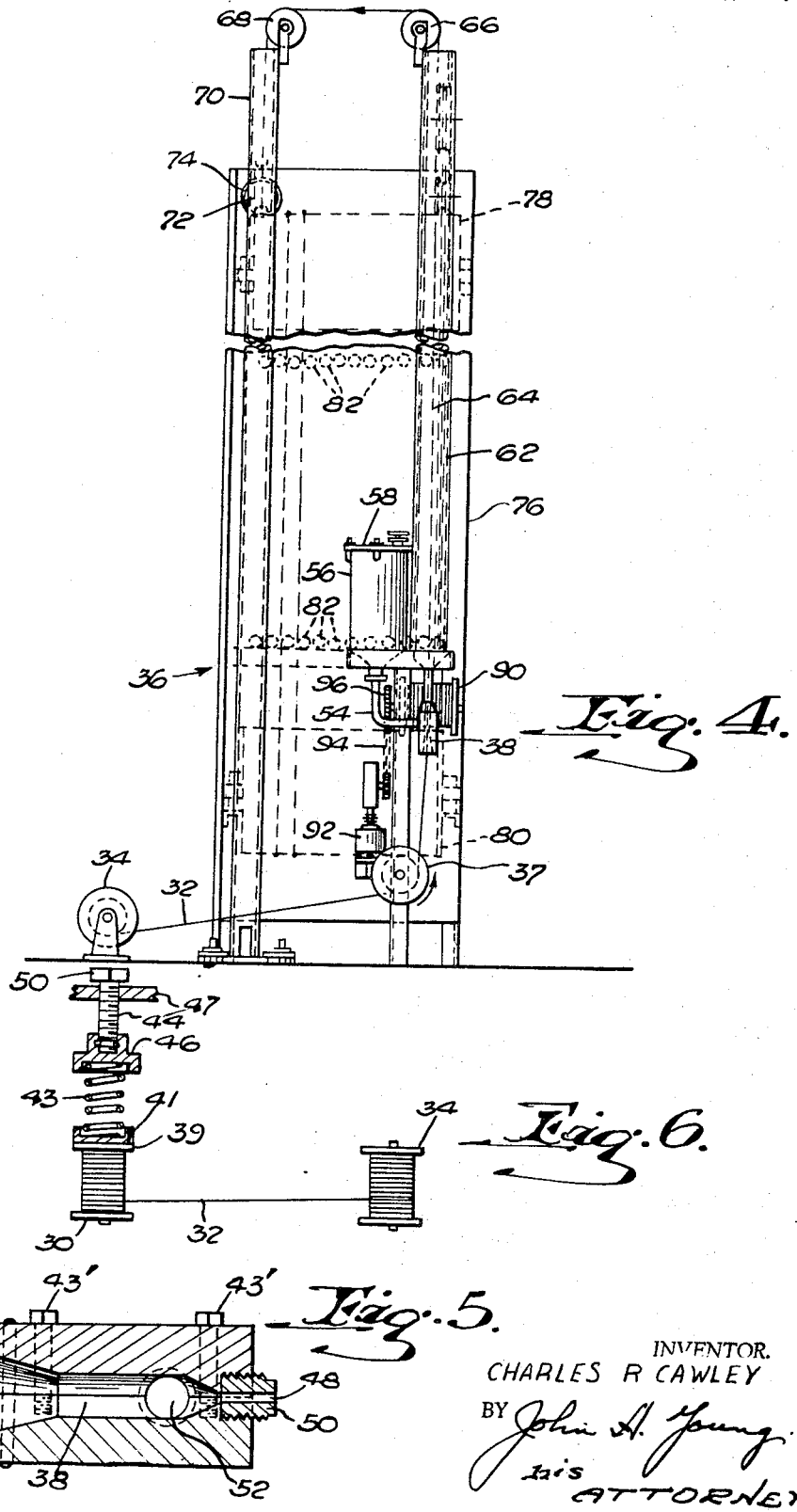

3,411,181
PROCESS FOR PRODUCING SEALING MATERIAL
Charles R. Cawley, Butler, Pa., assignor to Fre-Mar Industries, Butler, Pa., a corporation of Pennsylvania
Filed Jan. 14, 1965, Ser. No. 425,398
1 Claim. (Cl. 18—13)

ABSTRACT OF THE DISCLOSURE

A repair product comprised of a kitted sleeve and malleable plastic repair product is constructed by taking the knitted sleeve and effecting longitudinal stretching of the sleeve so that it becomes of uniform cross sectional diameter and has uniform orifice openings along the length of the sleeve to receive the plastic repair product which is extruded through the openings to form a solid central core surrounded by the sleeve. Thereafter, longitudinal tension on the repair product will have little, if any, effect on its dimension.

---

This invention relates to an improved process and apparatus for producing a sealing material, and more particularly to a sealing material which can be inserted into the injury of a tire or other pneumatic pressure containing body to effect a seal.

The prior art, has extensively used "patch" and "plug" type sealing materials which have met with only limited success. A repair material, which has proved to be far more versatile, and adapted for effecting a permanent seal for the injury of a tire or other pneumatic containing body, is the one disclosed in U.S. Patent Number 3,049,164, issued Aug. 14, 1962, and entitled, "Puncture Repair Material." Reference is made to this patent for details of the construction and composition of an outside-in repair product and for which the present invention is particularly adapted in its process and apparatus for the manufacture of such a repair product. This product is characterized in that it can be doubled or laced into the injury with a needle, from the outside of the tire and without demounting the tire.

The pair product resembles a cord and is laced into the injury by a suitable tool to fill the injury and effect a grip on the sides of the injury to maintain the repair material in operative position. The repair product is made up of a loosely woven or knitted sleeve which serves to carry the permanently malleable plastic repair product into the injury and which thereafter reinforces the permanently plastic material against extrusion from the injury. The principle in this case is to use the sleeve and its property of high tensile strength together with the flowable permanently malleable plastic material which is impervious to air and other gases, to effect a permanent repair.

The conventional method for making an outside-in repair product is to "soak" a first repair ingredient onto a plurality of filaments of a second repair ingredient but in this arrangement, the pores or spaces between the filaments is oftentimes incompletely filled with repair product and as a consequence, the cross section of the product is often accompanied with voids or other discontinuities. Also, the art has suggested the possibility of extruding a core of product and then weaving a sleeve over the surface of the core, but this method has proved unsatisfactory because it is inherently slower and is not as reliable a method of manufacturing a uniform product, as is the present invention.

The present invention, contemplates the production of a uniform repair product which is of uniform diameter and sealing ability throughout the length of the product and hence is manufacturable at a more precise cost and will render a repair product of more uniformly high quality. The present invention further contemplates the manufacture of a string-type repair product which is the combination of a sleeve of high tensile strength, and a permanently malleable repair product which is extruded or expressed under pressure through the pores of the sleeve and into the center of the sleeve where it forms a core of uniform density and completely fills the core without occurrence of voids or other discontinuities. Moreover, the repair product has provision for a lamination which completely covers the sleeve and this portion, can be abraded from the sleeve in order to reform and fill out all of the irregular spaces within the injury of the pneumatic body and will tightly grip the sides of the injury both to retain the repair product and also to prevent the occurrence of leakages.

Accordingly, it is one of the main objects of the present invention to produce a repair product which is of uniform properties and which is capable of providing a combination of repair ingredients, one ingredient consisting of a sleeve of high tensile strength and serving as a carrier for the second repair ingredient, which is a permanently malleable plastic material adapted to reform under pressure and which is floable to fill out and seal all of the ruptures or other faults that produce leakage paths.

A still further object of the present invention is to provide a new and improved repair product which is of uniform diameter throughout its length and which is substantially unchanged under tensile force so as to change in diameter under tensile load.

It is a still further object of the present invention to provide a process for producing a precisely sized product of substantially uniform diameter and sealing ability, throughout its length and which produces a more effective seal when it is inserted within the injury of a tire or other pneumatic pressure containing body.

It is a still further object of the present invention to provide a repair product including a sleeve of filament material which is woven, intertwined, knitted, braided or otherwise formed into a sleeve which is then tensioned along its length to produce a product of uniform diameter and distribution of openings therein and which is then capable of being passed through a container having permanently malleable plastic material which is expressed through such openings to form a core of uniform density and without the occurrence of voids therein so that the repair product produced is of uniform strength and sealing qualities throughout its length.

Other objects and features of the present invention will become apparent from a consideration of the following description, which proceeds with reference to the accompanying drawings wherein:

FIGURE 1 is a fragmentary detail view of a knitted sleeve which is produced in accordance with the present invention;

FIGURE 2 is a sectional view of a repair product including the combination of two sealing ingredients, a permanently malleable, flowable plastic material core and outer lamination, and the sleeve of FIGURE 1;

FIGURE 3 is a top view of the apparatus which is used for making the product;

FIGURE 4 is a side elevation view of the apparatus shown in FIGURE 3;

FIGURE 5 is an enlarged sectional view of the chamber which applies the malleable material into the sleeve; and FIGURE 6 is an enlarged detail view of the tensioning apparatus for exerting longitudinal tension on the sleeve material before it is passed through the apparatus of FIGURES 3 and 4, to produce the product of FIGURES 1 and 2.

Referring now to the drawings, the repair product, designated generally by reference numeral 10 includes a loosely knitted sleeve 12 of non-fibrous impervious material such as polypropylene, polyisobutylene, nylon or the like. The monofilaments are formed into a sleeve by knitting, braiding, weaving or any other suitable processing to form a continuous sleeve of high tensile strength and having a number of loops 14 which are intertwined and which provide a central core or opening 16. Throughout the length of the sleeve are pores or interstices through which the permanently malleable flowable plastic charge 20 can be expressed to form a core within the central opening 16 of the sleeve 12 and also to form an outer lamination 22 over the outer surface of the product.

The finished product is laced into the injury of the tire with a suitable tool, which is not part of the present invention, and which, for the sake of convenience, is a tool such as the one disclosed in co-pending application No. 145,692 filed Oct. 17, 1961, now issued as United as United States Patent No. 3,110,205 and assigned to the same assignee as the present invention.

The permanently plastic sealing material 20 is flowable under pressure and is a stable, heat-insensitive sealing material which grips the surface of the tire to form a locking connection therewith, the sealant being impervious to air in order to form a seal within the injury of the tire or other pneumatic pressure containing body. The sealant material is of a polysulfide composition.

One polysulfide composition which has been found satisfactory for the purposes of the instant invention comprises the polysulfide polymer LP–2 "Thiokol" which is a polymer of bis (ethylene oxy) methane containing disulfide linkages with terminal Thiol (—SH) groups.

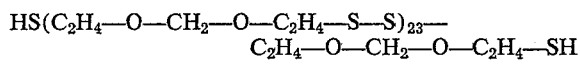

$$HS(C_2H_4—O—CH_2—O—C_2H_4—S—S)_{23}—$$
$$C_2H_4—O—CH_2—O—C_2H_4—SH$$

Obviously, other suitable polysulfides may be employed if found desirable.

A typical basic polysulfide formulation is as follows in parts by weight:

| | |
|---|---|
| Liquid polysulfide polymer (as above) | 100 |
| Carbon black | 30 |
| Curing agent: | |
| Lead dioxide | 70 |
| Stearic acid | 30 | the mixing ratio being 10 parts of base to one part of curing agent.

In order to carry this described repair material into the injury where it serves as a permanently malleable sealant, there is used the sleeve 12 as a carrier, the sleeve being comprised in one prefererd form of the invention, of polypropylene filament which is knitted or otherwise formed into a hollow sleeve construction, having a number of spaced openings throughout its length. The polypropylene combines the necessary qualities of tensile strength, heat resistance and is inert which makes it properly combinable with polysulfide without affecting its composition. The entire sealing material is heat-resistant. It can flex and can normally withstand all of the forces which are encountered at the site of an injury to a tire. Those forces which are encountered and which must be withstood by the tire repair material, include impact forces, tensile forces, as well as the usual heat and pressure from tire usage.

It is the function of the sleeve 12 to retain the permanently malleable plastic material in operative position against movement under pneumatic pressure, heat, flex, etc., in short, all of the forces which are encountered during tire use to prevent recurrence of loss of internal pneumatic pressure.

In the manufacture of the product, the sleeve 12 is first formed from monofilament by knitting, intertwining, weaving, etc., and is stored on a drum 30 (FIG. 6) from which it is fed as a continuous length 32 onto a second drum 34, and which serves as the supply drum 34 for the apparatus designated generally by reference numeral 36 (FIG. 4).

The tension of the sleeve 32 is maintained by a means of a friction clutch 39 forcibly engaged by a clutch plate 41, which is nonrotatable and which engages the plate 39 with a normal force produced by a compression spring 43. The compression spring 43 is loaded to a predetermined amount by a threaded stem 44, which forces the cup 46 in the direction of the clutch 39 and thereby compressing the spring to a preferred degree, the adjustment being turned down or backing off the threaded stem 44 within mounting plate 47 with a tool (not shown) acting on the head 50.

The repair material is stretched as it passes from drum 30 to drum 34. The sleeve is stretched, and assumes a uniform diameter with a uniform distribution of openings in the sleeve. Being thus stretched, the sleeve is no longer subject to change in physical dimension as it is stretched and, consequently, during use the sleeve material is thereby uniformly sized and will not vary in its physical dimension as it passes under longitudinal tension through the apparatus 36 (FIGURES 3, 4) in the process of its manufacture, nor in the process of being inserted within the injury of the pneumatic containing body.

Referring to FIGURES 3 and 4, the spool 34 containing the previously tensioned and uniformly sized sleeve 32 is passed over an idler drum 37 and then through a die pot chamber 38 having a quantity of the permanently malleable disulphide material therein and which is kept under pressure within the chamber 38 to cause it to pass through the interstices or openings which are spaced along the length of the sleeve and forms a continuous void-free core within the central opening of the sleeve which acts as a continuous shell for the core 20. The pressure within chamber 38 is sufficient to force the permanently malleable plastic material through the interstices to form a compact central core throughout the length of the sleeve. The chamber 38 is made in two sections and is held together by bolts 43'. At the inlet end of the chamber is a tapered opening 46 and an orifice 48 which is precisely dimensioned, so that its diameter provides a uniformly sized outer lamination for the sleeve 12, extending the length of the sleeve. The orifice 48 is formed within a replaceable plug 50 and can be substituted by other plugs having the preferred size orifice. Chamber 38 is supplied with plastic repair material from an opening 52 (FIG. 5) at the terminal end of a supply line 54 connecting with a supply tank 56, having a lid 58 which can be raised to allow for replenishing the repair material within the supply tank 56.

After the sleeve has been completely filled with a core of the repair material and has an accurately sized outer lamination 60, it then passes into a vertical enclosure 62 having spaced heating element 64 therein, the spacing and the intensity of heating the elements 64, determining the temperature within the enclosure 62. During the time that the repair product travels vertically upwardly within enclosure 62, it does not come into contact with any other surface and the rate of movement of the repair product, together with the height of the enclosure 62 establishes a heating time for the product during which it is entirely out of engagement with any other surface and hence the plastic material is allowed to "set" sufficiently so that it will not readily become scraped off or removed after it emerges from the chamber 38 where it receives the permanently malleable plastic material 20.

The repair product is caused to move in the directions indicated by exerting a tensile force on the repair product. That is, at the wind-up end of the apparatus (to be explained later) there is a drawing force exerted which is communicated back through the entire length of the product, strung through the apparatus, thus providing the necessary drawing or tensile force effort for passing the product through the apparatus.

At the top of the enclosure 62 is mounted a pulley 66 which serves as a change direction for the repair product which is then passed over a second change direction pulley 68 which directs the repair product downwardly into the enclosure 70 and to a third change direction pulley 72 which passes the repair product horizontally through an enclosure 74 and into a large vertically mounted heating tower 76 having rotatable drums 78 and 80 (FIG. 4) mounted for rotation at the upper and lower ends respectively. The repair product is passed back and forth between the drums 78, 80 and rides over the outer surfaces thereof, adjacent turns over the drum, being separated by fixed spacers 82, which are located in horizontal rows at the upper and lower ends of the heater tower.

Within the heating tower are a number of heating elements, thermostatically controlled (not shown), which are used to control the temperature within the heating tower. The heating temperature is that temperature required for a gradual polymerization, a typical temperature of about 140 degrees Fahrenheit and 45 minutes exposure time being suitable for effecting polymerization but without gasification within the interior of the core 20 which might otherwise produce discontinuities or vacuum openings within the repair product. After having passed over the drum approximately 15 or so times, sufficient time has elapsed for partial polymerization of the product and the end of the repair cord is then passed over a pulley 84 (FIG. 3) at the upper end of the heating tower, passing through an opening 86 and then over a second pulley 88 for downward movement and winding onto a wind-up drum 90. The wind-up drum is driven by a motor 92 (FIG. 4) which operates a chain drive 94 and friction clutch 96, which is effective for rotating the wind-up drum or reel 90. The purpose of the friction clutch is so that a substantially constant tensile force is exerted on the repair product as it is being wound onto the drum and as it is being drawn through the apparatus. Within the heating tower, the repair product is exposed to a level of temperature for a time sufficient to remove at least a portion of the volatiles, including any solvent content of the plastic material comprising the disulfide content of the newly prepared repair product.

The entire time of travel from start to finish can vary appreciably but is typically from about 40 to 45 minutes and the apparatus as described can run continuously and is capable of producing repair material of different sizes and compositions by merely changing the size of the orifice plug 50 and the composition of the material in the container 56.

The process described produces product at the rate of about 25 or so feet per minute but the speed is subject to variation and it has been further found that two or more strands can be simultaneously passed through the apparatus, side by side, providing that the strands are held out of contact with each other during their travel through the apparatus. This holds true, where the strands are passed through separate outlet orifices 48 and are thereafter strung through the enclosures and heating tower, being passed back and forth over the spaced drums 78 and 80.

Access to the interior of the heating tower can be had by means of a door 100 and control of the speed and temperature is obtainable by a control panel 102 which has various control knobs regulating temperature and speed of the apparatus.

In operation, the repair product is produced continuously, or semi-continuously, in the sleeve, which may be knitted, woven, braided, etc., and is pre-stretched (FIG. 6) between two reels and is elongated to substantially its maximum extent and thereby is uniformly sized as to diameter and distribution, size, etc. of the interstices through which the malleable repair product is expressed under pressure. Pre-stretching can be varied depending upon the size and composition of the sleeve, but where there is a polypropylene, or nylon sleeve, pre-stretching of about 45 to 60 pounds force with a 1/8–3/8" diameter product is a typical value. The pre-stretched sleeve is then passed continuously through the chamber 38 where it receives the polysulfide ingredient which forms a core and then an outer lamination and the product is then passed through enclosure 62 and through the heating tower 76 which is maintained at a temperature of about 100–170 degrees Fahrenheit and the temperature within the heating tower 76 is typically about 160 degrees Fahrenheit where the product is about 1/8–3/8" diameter and has a running speed of about 25 feet per minute. These values are, of course, varied depending upon the polymerization rate, final tackiness, running speed, size and composition of the product, these values may be established empirically to produce the desired result for a particular repair product. Mention of these specific sizes, temperatures, time, etc., are by no means restrictive of the invention and are mentioned only by way of illustration.

While the present invention has been illustrated and described in connection with a single example embodiment, it will be understood that this is illustrative of the invention and is by no means restrictive thereof. It will further be seen that the principal accomplishment of the present invention has been obtained because as the sleeve or repair product is passed through the apparatus and as it is subsequently used, it will not vary appreciably in dimension because of longitudinal stress placed upon the product. For example, when the sleeve material is drawn through the apparatus, it is drawn at no greater tensile force than has been previously exerted on the product, between the two reels 34 and 30 (FIG. 6), therefore, the dimensions of the product will not be appreciably changed. Also, after the polysulfide material is forced into the interior of the sleeve to form a continuous core, the sleeve is relatively stable against any dimensional changes and, therefore, the core material will be constant.

It is reasonably to be expected that those skilled in the art can make numerous revisions and adaptations of this invention to suit individual design requirements and it is intended that such revisions and changes which incorporate the herein disclosed principles, will be included within the scope of the following claim as equivalents of the invention.

What is claimed is:

1. Apparatus for constructing a repair product comprising a supply reel for containing a loosely knitted sleeve of hollow interior construction and consisting of knitted monofilaments of non-fibrous material, a friction clutch combined with said sleeve to effect stretching of said sleeve to a uniform length as it is drawn off of said supply reel, resilient means for developing frictional resistance to the turning of said supply reel to determine the tension at which the sleeve is drawn, adjustable means for controlling the resistance of said spring means and thereby establishing the tension at which said sleeve is drawn from said reel, means for effecting longitudinal tension on said sleeve by exerting a lengthwise drawing force to produce a pre-stretched and pre-sized sleeve having a uniform sizing of the diameter and distribution of openings throughout the length of said sleeve before it passes through said apparatus means defining a chamber for containing a permanently malleable charge of repair ingredient therein and through which said sleeve is passed to receive a flow of such repair material through the openings therein, and orifice means at the discharge end of said chamber, which is of larger diameter than said sleeve, to form a lamination of uniform dimension over the outer surface of said sleeve, and means for thereafter removing at least partially the solvent content of said malleable repair product.

References Cited

UNITED STATES PATENTS 3,187,070    6/1965    Marra _____ 264—174

ROBERT F. WHITE, *Primary Examiner.*

G. AUVILLE, *Assistant Examiner.*